Jan. 11, 1955
R. E. MAURICE
2,699,266
AUTOMOBILE STORAGE APPARATUS
Filed Feb. 26, 1952
2 Sheets-Sheet 1
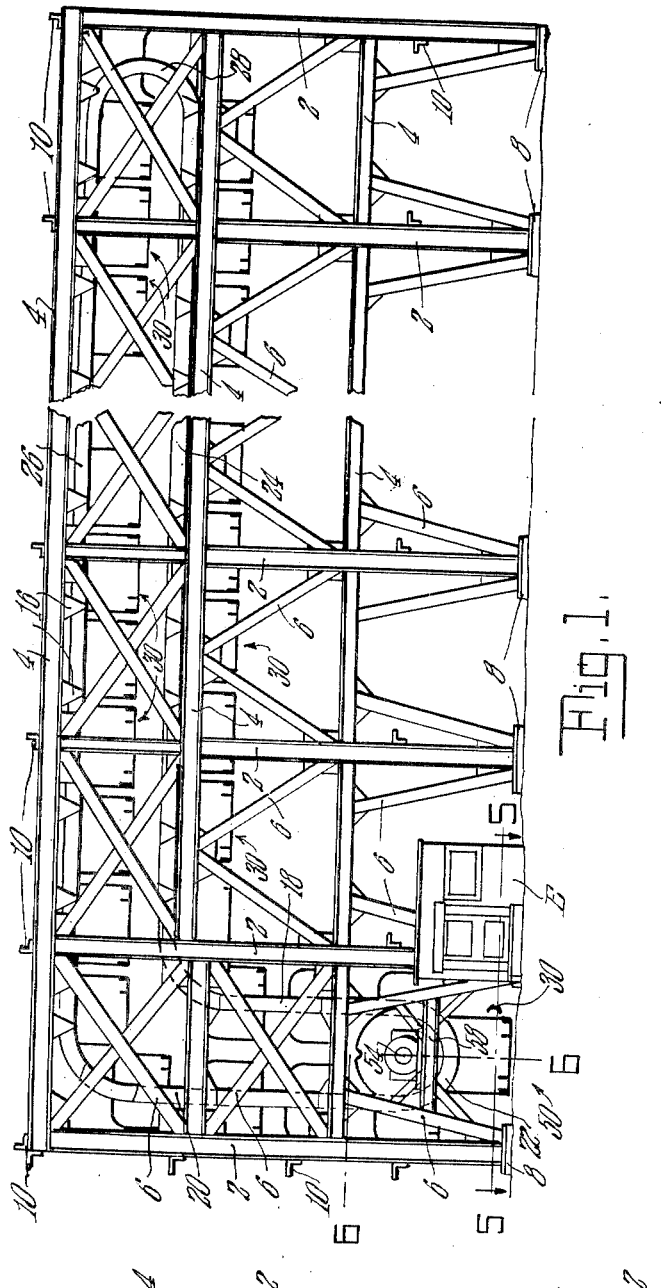
INVENTOR.
Reginald E. Maurice.
BY
Ross & Ross
Atty & Agent

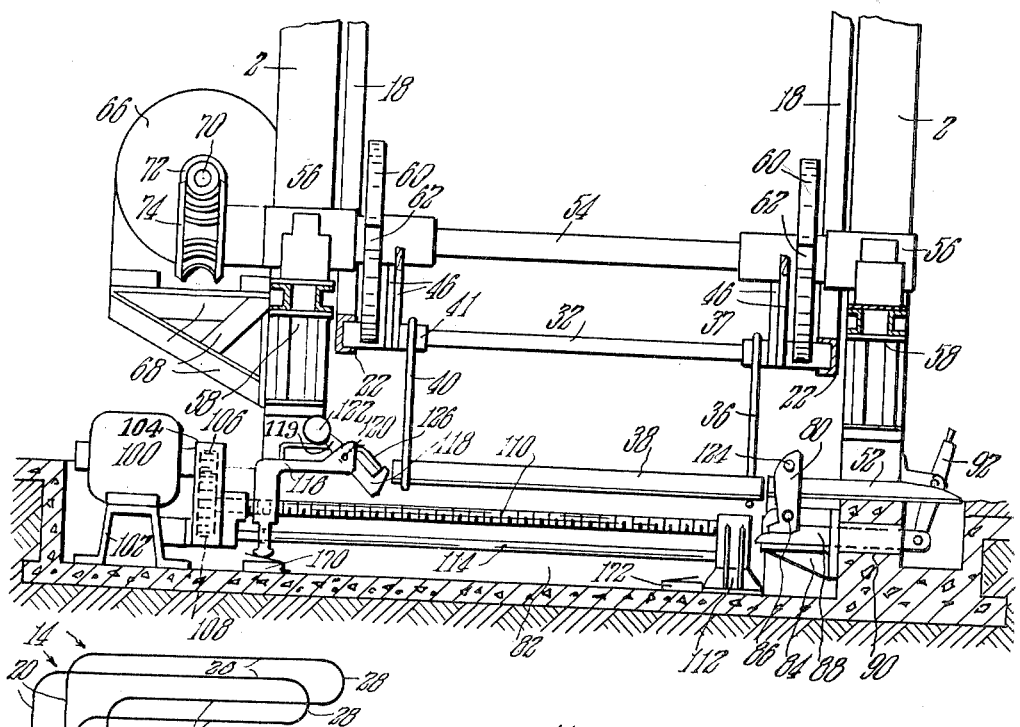

United States Patent Office 2,699,266
Patented Jan. 11, 1955

2,699,266

AUTOMOBILE STORAGE APPARATUS

Reginald E. Maurice, Springfield, Mass.

Application February 26, 1952, Serial No. 273,513

2 Claims. (Cl. 214—16.1)

This invention relates to improvements in automobile storage apparatus and is directed more particularly to apparatus adapted to receive and store successive automobiles and to selectively discharge them.

The principal objects of the invention are directed to the provision of apparatus which is constructed and arranged to receive automobiles successively and to discharge them successively as the owners may require them.

As a special feature of the invention, cradles for automobiles are at their opposite ends linked together and these slide in guideways or tracks at opposite ends of the cradles. The guideways are endless and have inner and outer runs arranged in the form of L's with the horizontal leg of the L arranged vertically and the vertical leg thereof disposed horizontally.

Automobiles are received at the lower end of the vertical legs and are moved upwardly and around the horizontal legs for storage.

The apparatus is arranged to be compact so as to occupy a minimum of space whereby a large number of vehicles may be accommodated and a plurality of similar apparatuses may be located in close adjacency without interference in the operation thereof.

Operating mechanisms are arranged to move the connected together cradles easily and rapidly so that any one certain automobile may be discharged or successive automobiles may be discharged while at the same time other automobiles may be successively received, all to the end that the parking or storage of automobiles is accomplished with facility.

All of the above objects I accomplish by means of such structure and relative arrangements of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claims hereunto annexed and more fully described and referred to in connection with the accompanying drawings whereof in:

Fig. 1 is a side elevational view of automobile storage apparatus embodying the novel features of the invention;

Fig. 2 is a transverse sectional view on the line 2—2 of Fig. 1 to illustrate the arrangement of the guideway at one side of the apparatus and with the cradle omitted for clearness;

Figs. 3 and 4 are end and side elevational views of one of the cradles of the apparatus;

Fig. 5 is a sectional plan view on the line 5—5 of Fig 1;

Fig. 6 is a sectional elevational view on the line 6—6 of Fig. 1;

Fig. 7 is a wiring diagram to explain the operating apparatus; and

Fig. 8 is a diagrammatic perspective view to illustrate the form and arrangement of the guideways.

Referring now to the drawings more in detail, the invention will be fully described.

Fig. 1 shows the front side of the apparatus which includes secured together vertical columns 2, longitudinal stringers 4 and various struts or braces 6 all of which may be structural shapes. The rear side is of similar construction and the vertical members 2 may be secured on foundation piers 8 and transverse members 10 extend between and secure the front and rear sides of the supporting structure together in transversely spaced relation.

The supporting structure may be enclosed by suitable walls if desired, but the same are omitted herein for clearness.

Guideways 14 which are similar are secured in transversely spaced relation to the supporting structure by gussets 16 or the like which are fixed to the guideways and supporting structure. Each guide is in the form of an L, as shown in Fig. 8, to have inner and outer vertical end runs 18 and 20 which are joined at lower ends as at 22 and upper inner and outer horizontal runs 24 and 26 joined at outer ends as at 28. The guideways are endless and are of channel formation in transverse cross sections, as best shown in Fig. 2 so as to provide endless tracks.

A plurality of cradles 30, best shown in Figs. 3 and 4, are provided which have upper elongated rods 32 provided with rolls 34 rotatable on opposite ends which roll along the tracks or guideways.

Front suspension members 36 extend outwardly from opposite sides of sleeves 37 on the rods 32 and then downwardly and lower extremities thereof are fixed to forward ends of elongated wheel receiving guides 38.

Rear suspension members 40 in the form of inverted V's have ends fixed to sleeves 41 on the rods 32 and have lower portions 42 around and secured to rear ends of the guides 38. Links or rods 46 have opposite ends pivotally connected to rods 32 of adjacent cradles so that the cradles are linked together and provide endless chains composed of cradles adapted to receive and carry automobiles. The cradles are linked together by the members 46 thereby taking advantage of the tensile and compressive strength of the members 46 as the cradles are rotated around the endless tracks. That is to say, the members 46 have the capacity to push as well as to pull as the cradles are moved around the tracks.

The entrance and discharge point for automobiles indicated by 50 is at the left in Fig. 1 and between the two endmost vertical columns 2. At this location, as in Fig. 5, ramps 52 are provided for the wheels of an automobile and relative to which the guides 38 of a cradle are aligned in receiving or discharging position.

With the rolls 34 of the cradles in the tracks 14 and the links or rods 46 connecting the cradles so as to provide an endless series of cradles, the cradles may be moved around the tracks to locate an empty cradle at the entrance for taking on an automobile or any particular cradle may be located at the entrance for discharging an automobile.

Driving means for the cradle linkage is provided, see Fig. 6. In the form of the invention shown, a drive shaft 54 is rotatable in bearings 56 supported from the structure at 58. Said shaft 54 has spaced sprocket wheels 60 fixed thereto which are provided with sockets operably receiving the rolls 34 of the cradle shafts 32. A reversible electric motor 66 supported by members 68 fixed to the rear side of the supporting structure has a drive shaft 70 on which a worm 72 is fixed. Said worm 72 is in mesh with a worm gear 74 fixed to shaft 54. As the motor 66 is energized for rotation in one direction or the other, the shaft 54 is rotated in one direction or the other so that the cradles are moved around the tracks in the desired direction. Other means may be employed to rotate the shaft 54, if desired.

Automobiles on members 52 to be received in a cradle are prevented from entering the cradle by a stop 80, see Fig. 6.

A pit 82 is formed at the entrance point of the apparatus by concrete or the like as indicated and a bracket 84 is fixed therein to which stop 80 is pivoted at 86.

A slide 88 reciprocable in a tube 90 of bracket 84 is moved back and forth by a lever 92 pivotally connected thereto. When the slide 88 is moved to the right from the position shown in Fig. 6, it abuts the stop so as to swing it forwardly or to the left so that an automobile on members 52 may roll forwardly onto a cradle. With the slide in the forward position and its forward end beneath the stop, as shown, the said stop is held in upright stop position.

If desired, members 52 may be arranged to decline towards the cradle and the members 38 of the cradles may be arranged to decline rearwardly so that an automobile may roll from members 52 into a cradle.

Means is, however, provided for transferring an automobile between members 52 and the cradles and includes the following.

A reversible motor 100 is mounted in the pit by means of a support 102. A gear casing 104 secured to the support has a drive gear 106 fixed to the shaft of the motor and a gear 108 in mesh therewith which is fixed to a rotatable screw 110. The forward end of screw 110 is rotatable in a bearing 112 fixed in the pit and a guide rod 114 extends between casing 104 and the bearing 112.

A dog 116 is in threaded engagement with screw 110 and has a lower portion slidable on rod 114. As screw 110 is rotated in one direction or the other, the dog is moved accordingly. In moving forwardly or to the right from the position of Fig. 6, an upstanding portion thereof, as shown, engages the bumper or the like of an automobile on a cradle and pushes it therefrom onto the members 52 and then the stop 80 may be swung upwardly to the stop position.

A hook member 118 pivoted to the dog 116 at 120 has a hook on its forward end as shown and is weighted at 122 at its rear end. The normal position of the member 118 is a vertical position perpendicular to the longitudinal axis of the dog 116.

With the dog 116 in position adjacent the forward end of an automobile in readiness to roll onto a cradle, the stop 80 is swung counterclockwise so as to pivot the hook 118 upwardly by means of a pin 124 thereof which engages the upper portion 119 of said hook and urges it rearwardly. When adjacent an incoming automobile and as the stop 80 is swung counterclockwise from the stop position, the hook 118 is elevated thereby so as to be positioned behind the bumper of the automobile and so as to engage same and to move the automobile onto the cradle as the dog moves to the left. A cam 126 is arranged so that it is engaged by the weighted end of the hook as the dog arrives at the position of Fig. 6, thereby to swing the hook clockwise for releasing engagement with the automobile.

The dog, therefore, moves to the right to discharge an automobile from a cradle and thereafter the stop may be swung to stop position. With the dog in position to engage an automobile, the stop swings to release the automobile and moves the hook to engaging position. When the automobile is located on a cradle, the cam disengages the hook therefrom.

Plates such as 124' are secured to the cradles and are spaced apart at 126 for the passage of the dog 116 therethrough, see Fig. 5.

An enclosure represented by E may be provided adjacent the entrance 50 as shown in Fig. 1.

According to the invention, the dog is not operable back and forth while the cradles are being moved about the tracks and is accomplished in the manner to be described in connection with Figs. 1 and 7.

A power line is represented by 130, one side of which is connected by 132 and 134 to the motors 100 and 66. A switch arm 136 connected by 138 to the other side of the power line is arranged to make contacts 140, 142 and 144. Contacts 140 and 144 are connected by 146 and 148 to motor 66. Accordingly, as said arm contacts one or the other of contacts 140 or 144, the motor 66 is energized for rotation in one direction or the other to move the cradles about the track in one direction or the other.

A connection 150 extends from contact 142 to a switch arm 152 and connections 154 and 156 extend from said contacts to motor 100. Limit switches 170 and 172 are in connections 154 and 156 and are of the normally closed type located so as to be operated by dog 116 at opposite ends of its stroke.

Motor 100 may not be energized through switch arm 152 at the same time motor 66 is in operation and as the dog 116 operated by screw 110 reaches the end of its travel with motor 100 in operation a limit switch is operated by the dog to open the circuit.

From the foregoing it will be noted that the apparatus is adapted to readily and easily receive, store and discharge a large number of vehicles and that it occupies but small space. It will be apparent that other tracks for cradles may be disposed beneath the tracks shown and with driving means and controls therefor the same may be operated independently of the apparatus shown.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. The combination with transversely spaced endless flexible members of automobile storage apparatus arranged in lower and upper horizontal and in inner and outer vertical runs and having cradles connecting said flexible members provided with guideways for receiving automobiles transversely thereof when located at the lower junction of the inner and outer vertical runs of said flexible members for moving automobiles onto and off from said cradles comprising, ramps for guiding an automobile onto and off from said cradles, a stop movable between a stop position wherein an automobile on said ramps is held thereby against movement onto said cradles and a releasing position, a screw extending transversely of said flexible members rotatable in opposite directions and mounting means therefor, a reversible electric motor operatively connected to said screw, a dog in threaded engagement with said screw movable thereby towards said ramps into adjacency with said stop in discharging an automobile from said cradles and away therefrom to a rear position in transferring an automobile from said ramps to one of said cradles, a hook pivotally connected to said dog swingable between automobile engaging and releasing positions, manually operable means for releasably holding said stop in stop position, said hook and stop provided with engageable means arranged whereby with said stop in releasing position said hook is swung to engaging position as said dog arrives into adjacency with said stop, means for engaging and swinging said hook to releasing position as said dog arrives at rear position, and means for operating said motor.

2. Apparatus set forth in claim 1 wherein said means for operating said motor includes a source of power and connections between said source of power and motor having independently operable switches therein disposed to be engaged and activated by said dog at opposite ends of its movement.

References Cited in the file of this patent

UNITED STATES PATENTS

| | | |
|---|---|---|
| 1,871,372 | James | Aug. 9, 1932 |
| 1,896,063 | Bottini | Feb. 7, 1933 |
| 2,609,112 | McKenzie | Sept. 2, 1952 |

FOREIGN PATENTS

| | | |
|---|---|---|
| 681,892 | France | May 20, 1930 |